Patented Jan. 14, 1930

1,743,633

UNITED STATES PATENT OFFICE

SAMUEL LEWIS SUMMERS, OF FORT WASHINGTON, PENNSYLVANIA

METHYLENE-DISALICYLIC ACID DERIVATIVE

No Drawing.   Application filed Octber 12, 1928. Serial No. 312,201.

My invention relates to organic compounds and their manufacture and is especially concerned with novel acetylation products of the di(aminobenzyl) ethers of methylene-disalicyl amide, useful for pharmaceutical purposes, as hereinafter described.

My products may be prepared as follows:

Starting with methylene-disalicylic acid the first main step is the conversion of this acid into an ester, preferably its diethyl ester. As the alcohol is replaced in the second step the nature of the alcohol used is of little consequence. The esterification may be accomplished as follows, though I do not limit myself to this particular method:

Dissolve 288 pounds of methylene-disalicylic acid in 150 pounds of ethyl alcohol and slowly add to this solution a mixture of 60 pounds of sulphuric acid 66° Bé. and 40 pounds of water, keeping the temperature below 70° C. When all of the acid has been added the mixture is heated under a reflux condenser to 150 C. for two hours. The essential product is the diethyl ester of methylene-disalicylic acid:

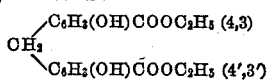

This is freed from sulphuric acid by washing with water.

The second main step is to convert this ester into the corresponding amide. One method of accomplishing this is as follows:

348 pounds of the above described ester is mixed with 200 pounds of strong aqueous ammonia ("concentrated" or 28%) and heated in an autoclave for 8 hours at 110° C. The excess of ammonia, the water and the alcohol formed during the reaction are gotten rid of by evaporation, which leaves methylene-disalicyl amide as the essential product:

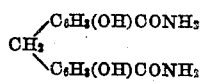

It is immaterial whether this amide is obtained in this way through the ester or from methylene-disalicylic acid by some other method.

The third main step is to substitute nitrobenzyl groups in the two hydroxyls of the above described amide. One way of doing this, to which I do not limit myself, is as follows:

286 pounds of methylene-disalicyl amide is intimately mixed with 345 pounds of nitrobenzyl chloride and 250 pounds of sodium carbonate, and heated to 130° C. for 24 hours. The essential product is a di(nitrobenzyl) ether of methylene-disalicyl amide:

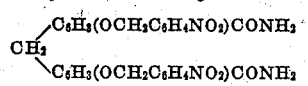

This is purified by washing with water. In this preparation any one of the three isomeric nitrobenzyl chlorides may be used with corresponding differences in the products, which, however, are of the same nature and go through the subsequent reactions in the same way to yield products which are similar and which are equally useful for pharmaceutical purposes.

The fourth main step is to reduce the two nitrobenzyl groups of the above described product to amino groups. This may be effected by the use of various reducing agents; but one way is as follows:

Mix 556 pounds of the above described di-(nitrobenzyl) substitution product with 400 pounds of free metallic zinc, preferably in the form of dust, and 1800 pounds of hydrochloric acid. After the heat of the spontaneous chemical reaction has subsided, the mass is heated to 100° C. and maintained at that temperature for 4 hours. The mixture is made slightly alkaline by the addition of ammonia water, which causes the separation of the desired diamino derivative, which is filtered off and washed with water to free it from zinc salts. The product is dissolved in alcohol and freed from any remaining zinc salts by saturating the solution with hydrogen sulphide. The alcohol is eliminated by evaporation, leaving the essential product which is a di(aminobenzyl) ether of methylene-disalicyl amide:

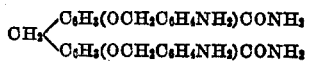

The fifth main step is the acetylation of the

—$NH_2$ groups in this compound; it being possible to introduce two or four acetyl groups according to the proportions of reactants used and the time and temperature of heating. One way of accomplishing this acetylation, to which I do not limit myself, is to heat 496 pounds of the amino derivative (obtained as above) with 150 pounds of glacial acetic acid to the temperature of 110° C., for 24 hours. The product is washed with water to eliminate excess of acetic acid. The essential product is the diacetyl derivative of a di(aminobenzyl) ether of methylene-disalicyl amide:

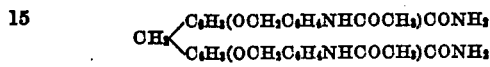

By the use of larger proportions of acetic acid, or preferably acetanilide, acetyl groups may be introduced into the two other $-NH_2$ groups. The diacetyl and the tetraacetyl derivatives are crystalline substances insoluble in water but soluble in alcohol. Both of them are useful as antiseptics, antineuralgic, antiarthritic and antirheumatic drugs; of which the doses may be 90 to 180 grains per day.

Having thus described my invention, I claim:

1. The hereindescribed di(aminobenzyl) ethers of methylene-disalicyl amide, typified by the formula

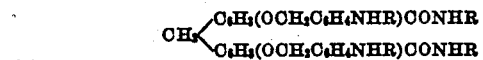

wherein R may represent the acetyl group or hydrogen.

2. The hereindescribed acetylation products of the di(aminobenzyl) ethers of methylene-disalicyl amide, typified by the formula

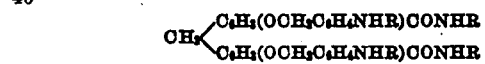

wherein R may represent the acetyl group or hydrogen, but having at least two R's as acetyl groups.

In testimony whereof, I have hereunto signed my name at Ambler, Pennsylvania, this 9th day of October, 1928.

SAMUEL LEWIS SUMMERS.